(12) United States Patent
Chen et al.

(10) Patent No.: US 12,381,382 B2
(45) Date of Patent: Aug. 5, 2025

(54) INSULATION SUPPORTING ASSEMBLY AND GAS-INSULATED TRANSMISSION LINE

(71) Applicant: Hitachi Energy Ltd, Zürich (CH)

(72) Inventors: Tiansong Chen, Xiamen (CN); Dajin Chen, Xiamen (CN); Xiuming Xu, Xiamen (CN); Xinlin Huo, Xiamen (CN); Jieshen Nong, Xiamen (CN); Longguang Chen, Xiamen (CN)

(73) Assignee: HITACHI ENERGY LTD, Zürich (CH)

( * ) Notice: Subject to any disclaimer, the term of this patent is extended or adjusted under 35 U.S.C. 154(b) by 847 days.

(21) Appl. No.: 17/434,521

(22) PCT Filed: Apr. 29, 2019

(86) PCT No.: PCT/CN2019/085014
§ 371 (c)(1),
(2) Date: Aug. 27, 2021

(87) PCT Pub. No.: WO2020/220206
PCT Pub. Date: Nov. 5, 2020

(65) Prior Publication Data
US 2022/0140588 A1    May 5, 2022

(51) Int. Cl.
*H02G 5/06*    (2006.01)
*H01B 3/56*    (2006.01)

(52) U.S. Cl.
CPC ............ *H02G 5/066* (2013.01); *H01B 3/56* (2013.01); *H02G 5/065* (2013.01)

(58) Field of Classification Search
CPC .......... H02G 5/066; H02G 5/065; H02G 5/06; H01B 3/56; H01B 17/14; H01B 17/38; H01B 17/42

(Continued)

(56) References Cited

U.S. PATENT DOCUMENTS 3,061,665 A * 10/1962 Rugg ..................... H02G 5/061
                                                                                   174/99 B
3,725,567 A * 4/1973 Olsen ..................... H02G 5/066
                                                                                   174/99 B (Continued)

FOREIGN PATENT DOCUMENTS

CN       102255268 A      11/2011
CN       103700454 A      4/2014

(Continued)

OTHER PUBLICATIONS

International Search Report and Written Opinion of the International Searching Authority, PCT/CN2019/085014, mailed Feb. 1, 2020, 9 pages.

(Continued)

*Primary Examiner* — Angel R Estrada
(74) *Attorney, Agent, or Firm* — Sage Patent Group

(57) ABSTRACT

Embodiments of the present disclosure provide an insulation supporting assembly. The insulation supporting assembly includes an insulator and at least one connecting plate. The insulator includes a central portion and at least one supporting leg. The central portion includes a through hole extending along a central axis and adapted to receive an inner conductor of a gas-insulated transmission line. The supporting leg extends outwardly from the central portion in a radial direction normal to the central axis. Each of the connecting plates is arranged at an end of a respective supporting leg and includes at least one first hole for mounting the respective connecting plate to an outer enclosure of the gas-insulated transmission line by a first threaded fastener. Embodiments of the present disclosure provide a gas-insulated transmission line including the above-mentioned insulation supporting assembly as well.

10 Claims, 4 Drawing Sheets

(58) Field of Classification Search
USPC ............ 174/99 B, 17 R, 14 R, 28, 16.2, 115, 174/84 R, 85
See application file for complete search history.

(56) References Cited

U.S. PATENT DOCUMENTS

| | | | | | |
|---|---|---|---|---|---|
| 3,739,074 | A | * | 6/1973 | Floessel | H02G 5/066 174/99 B |
| 4,064,353 | A | * | 12/1977 | Bolin | H02G 5/065 174/14 R |
| 4,084,064 | A | * | 4/1978 | Bowman | H02G 5/065 174/14 R |
| 4,085,807 | A | * | 4/1978 | Bolin | H02G 5/065 174/14 R |
| 4,328,391 | A | * | 5/1982 | Cookson | H02G 5/065 174/14 R |
| 4,335,268 | A | * | 6/1982 | Dale | H02G 5/065 174/14 R |
| RE31,949 | E | * | 7/1985 | Hopkins | H02G 5/066 174/14 R |
| 4,711,973 | A | | 12/1987 | Meyer et al. | |
| 4,743,709 | A | | 5/1988 | Meyer et al. | |
| 5,811,734 | A | * | 9/1998 | Ponsioen | H02G 5/066 174/68.2 |

FOREIGN PATENT DOCUMENTS

| | | |
|---|---|---|
| CN | 203632160 U | 6/2014 |
| CN | 204290123 U | 4/2015 |
| CN | 205384910 U | 7/2016 |
| CN | 205489368 U | 8/2016 |
| CN | 107403670 A | 11/2017 |
| CN | 207250239 U | 4/2018 |
| JP | S5149485 A | 4/1976 |
| JP | H11146541 A | 5/1999 |

OTHER PUBLICATIONS

Extended European Search Report for EP Patent Application No. 19927502.5, mailed Oct. 21, 2022, 8 pages.

* cited by examiner

INSULATION SUPPORTING ASSEMBLY AND GAS-INSULATED TRANSMISSION LINE

CROSS REFERENCE TO RELATED APPLICATIONS

This application is a 35 U.S.C. § 371 national stage application of PCT International Application No. PCT/CN2019/085014 filed on Apr. 29, 2019, the disclosure and content of which is incorporated by reference herein in its entirety.

FIELD

Embodiments of the present disclosure generally relate to the field of gas-insulated equipment, and more specifically, to an insulation supporting assembly and a gas-insulated transmission line comprising the same.

BACKGROUND

A gas-insulated transmission line (GIL) typically comprises a hollow, cylindrical outer enclosure, an inner conductor arranged within, but spaced apart from, the outer enclosure, and a compressed gas, such as sulfur hexafluoride or the like, in the enclosure to electrically insulate the conductor from the enclosure. An insulator is arranged in the outer enclosure and supports the conductor therein. With respect to the assembly of the gas-insulated transmission line, the insulator is generally welded to the outer enclosure and the conductor. In some other cases, the insulator may be mounted to the conductor via mechanical wedge connection and necking process.

During the welding process, welding spatters may contaminate, for example, the insulator, the conductor, and an inner surface of the enclosure. Complex measures are needed to avoid such contaminations. As to mechanical wedge connection and necking process, it may be time-consuming and costly to prepare the special jig(s) for the process. Furthermore, it will damage the welding or mechanical wedge connection and necking connection structures when replacing or removing the insulator.

SUMMARY

In general, embodiments of the present disclosure provide an insulation supporting assembly and a gas-insulated transmission line comprising the same.

In one aspect of the present disclosure, there is provided an insulation supporting assembly. The insulation supporting assembly comprises an insulator and at least one connecting plate. The insulator comprises a central portion and at least one supporting leg. The central portion comprises a through hole extending along a central axis and adapted to receive an inner conductor of a gas-insulated transmission line. The supporting leg extends outwardly from the central portion in a radial direction normal to the central axis. Each of the connecting plates is arranged at an end of a respective supporting leg and comprises at least one first hole for mounting the respective connecting plate to an outer enclosure of the gas-insulated transmission line by a first threaded fastener.

In this way, the insulator is mounted to the inside of the enclosure by a threaded fastener, such as a bolt or a screw, via the connecting plate. Such connections may avoid welding spatters and are more convenient to implement compared to welding and mechanical wedge connection and necking process. In addition, the insulator may be replaced or removed by simply loosing the threaded fastener.

In some embodiments, each of the supporting legs may comprise a metallic insert at the end. Furthermore, each of the connecting plates may comprise a curved body adapted to be mounted to the metallic insert of the respective supporting leg by a second threaded fastener. In this way, connections between the supporting leg(s) of the insulator and the connecting plate may be implemented by threaded fastener as well, and thus the above-mentioned benefits may apply to these embodiments as well. In addition, a curved body of the connecting plate may better fit to the intrinsic curvatures of the outer enclosure or a particle trap (if any), thereby easier and more stable connections may be provided between related components.

In some embodiments, each of the connecting plates may further comprise a projection portion protruding from the curved body. The projection portion may comprise a top surface contacting with an outer surface of a respective metallic insert. In this way, the contact and connection between the connecting plate and the respective metallic insert may be in the form of a surface-to-surface contact, and thus may be more stable and reliable.

In some embodiments, each of the connecting plates may be made of aluminum alloy or steel. Furthermore, the connecting plate may comprise a thickness in a range of 3 mm to 5 mm, in particular, 3.5 mm to 4.5 mm. Such a material and dimension may ensure necessary strength and rigidity of the connecting plate in order to provide a reliable connection.

In some embodiments, the insulator may further comprise a sleeve. The sleeve may be arranged in the through hole of the central portion of the insulator and comprise at least one third hole for mounting the sleeve to the inner conductor of the gas-insulated transmission line by a third threaded fastener. In this way, the insulator may be mounted to the inner conductor by a threaded fastener as well, and thus the above-mentioned benefits may apply to the connection between the insulator and the inner conductor.

In some embodiments, an outer surface of the sleeve may comprise a curved section such that the outer surface of the sleeve may taper as extending along the central axis to an end of the sleeve. Such a tapered shape of the sleeve may prevent charge from accumulating at a sharp corner otherwise formed on the outer surface of the sleeve such that a risk of breakdown an insulating gas in the outer enclosure may be minimized.

In another aspect of the present disclosure, there is provided a gas-insulated transmission line. The gas-insulated transmission line comprises: an outer enclosure at a first electrical potential; an inner conductor at a second electrical potential higher than the first electrical potential; and an insulation supporting assembly according to the above-mentioned aspect. Each of the connecting plates of the insulation supporting assembly is mounted to the outer enclosure by a first threaded fastener.

In this way, the above-mentioned benefits of the insulation supporting assembly may also apply to the gas-insulated transmission line, thereby both assemble and disassemble of the gas-insulated transmission line may be improved both in efficiency and economic.

In some embodiments, the outer enclosure may comprise at least one protrusion at a position corresponding to each of the connecting plates. Each of the connecting plates may be mounted to a respective protrusion by a first threaded fastener. In this way, a simple way of mounting the connecting plate to the outer enclosure may be provided.

In some embodiments, the insulator may be mounted to the inner conductor by a third threaded fastener.

Through the following illustration of the example embodiments with reference to the drawings, features of the present disclosure become more apparent. It should be appreciated that the Summary is not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same or similar component in the example embodiments of the present disclosure.

DETAILED DESCRIPTION OF EMBODIMENTS

Figure 1:
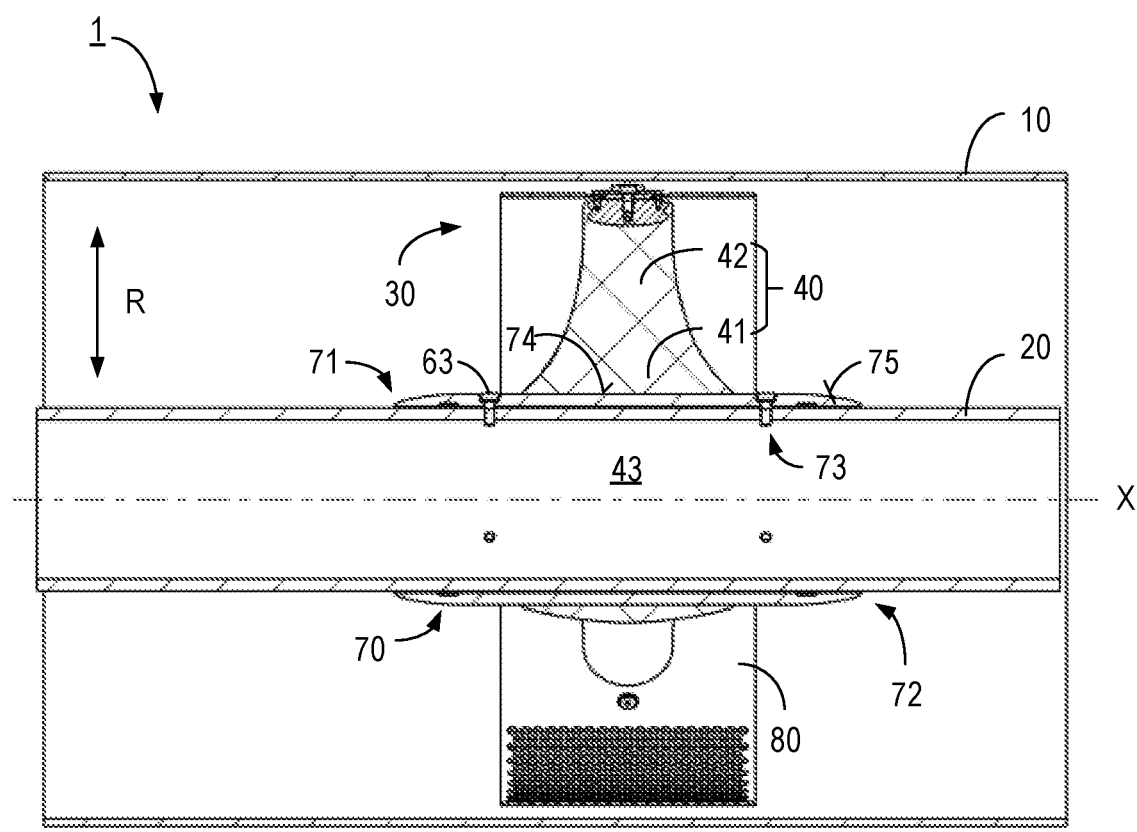
FIG. 1 illustrates a section view of a gas-insulated transmission line according to embodiments of the present disclosure, along a central axis of the gas-insulated transmission line.

Principles of the present disclosure are now explained with reference to various example embodiments shown in the drawings. It should be appreciated that description of those embodiments is merely to enable those skilled in the art to better understand and further implement the present disclosure and is not intended for limiting the scope disclosed herein in any manner. It should be noted that similar or same reference signs can be used in the drawings where feasible, and similar or same reference signs can represent similar or same functions. Those skilled in the art will easily recognize from the following description that alternative embodiments of the structure and the method described herein can be adopted without deviating from the principles of the present invention described herein.

As described above, one or more problems occur in mounting or demounting an insulator to/from a gas-insulated transmission line. In general, an insulation supporting assembly according to embodiments of the present disclosure utilizes a detachable connection structure with a threaded fastener, thereby providing a more convenient and efficient way of mounting or demounting an insulator. Therefore, an insulation supporting assembly and a gas-insulated transmission line comprising the same, according to embodiments of the present disclosure, would at least in part solve the above-mentioned problems in conventional arrangements. Some example embodiments of the insulation supporting assembly and the gas-insulated transmission line comprising the same are now described with reference to FIGS. 1 to 5.

Figure 2:
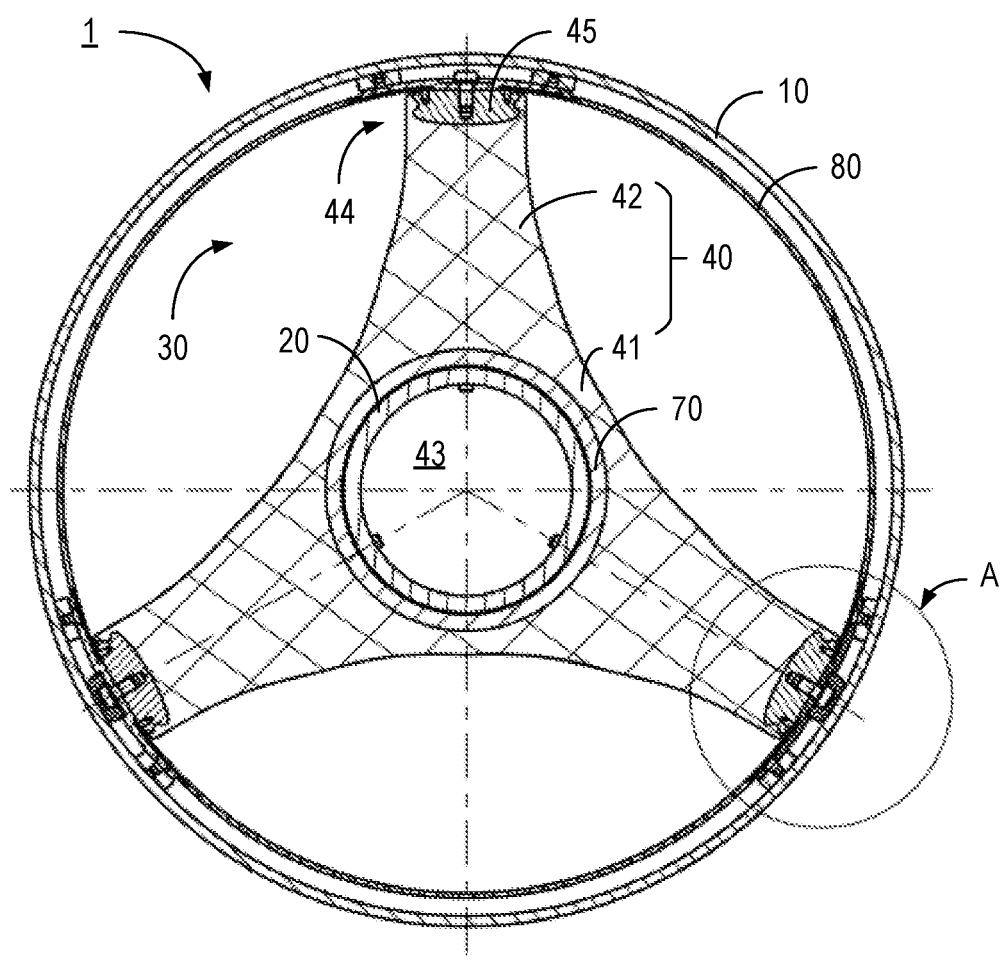
FIG. 2 illustrates a further section view of the gas-insulated transmission line as shown in FIG. 1, perpendicular to the central axis of the gas-insulated transmission line.
Figure 3:
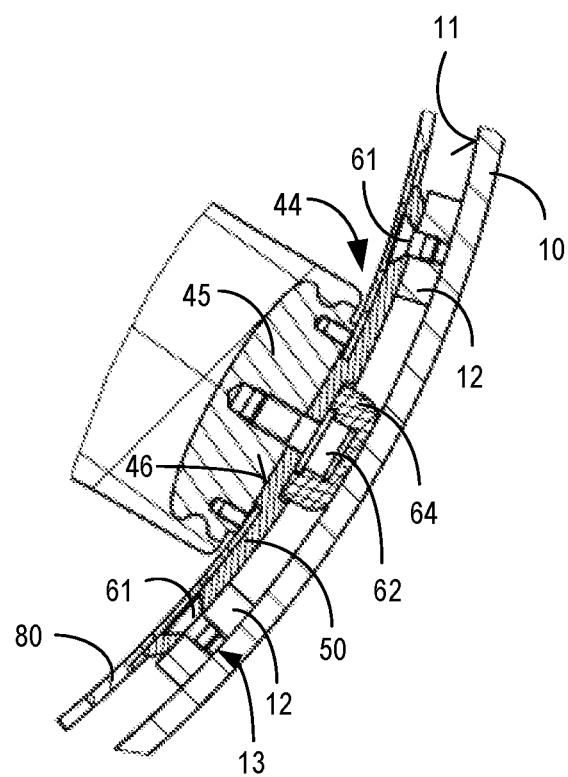
FIG. 3 is a partially enlarged view of FIG. 2 (the region depicted by letter A in FIG. 2), showing more details of connection between a supporting leg and an outer enclosure.

As shown in FIGS. 1 to 3, generally speaking, a gas-insulated transmission line 1 according to embodiments of the present disclosure comprises an elongated, cylindrical outer enclosure 10, and an elongated inner conductor 20 arranged therein. The inner conductor 20 is co-axial with the outer enclosure 10 with respect to a central axis X.

Usually, the outer enclosure 10 operates at a relatively low electrical potential (also referred to as "a first electrical potential" herein), such as a ground electrical potential; whereas the inner conductor 20 operates at a relatively high electrical potential (also referred to as "a second electrical potential" herein), such as in a range of 115 kV-1200 kV.

The outer enclosure 10 and the inner conductor 20 can be made of good electrically-conducting materials, such as aluminum alloy. An insulation supporting assembly 30 is arranged between the outer enclosure 10 and the inner conductor 20 for supporting the inner conductor 20 in the outer enclosure 10.

As shown, the insulation supporting assembly 30 comprises an insulator 40. The insulator 40 comprises a central portion 41 and at least one supporting leg 42. A through hole 43 is provided in the central portion 41. The through hole 43 extends along the central axis X and is adapted to receive the inner conductor 20. One or more supporting legs 42 extend outwardly from the central portion 41 in a radial direction R which is substantially normal to the central axis X. Each supporting leg 42 has an end 44 away from the central portion 41.

It is to be understood that although three supporting legs 42 are shown in FIG. 2, this is merely for the purpose of illustration without suggesting any limitation as to the scope of the present disclosure. In other embodiments, there can be any suitable number of supporting leg(s) 42. In some embodiments, both the central portion 41 and the supporting leg 42 are made of insulating material, such as epoxy resin. The central portion 41 and supporting leg 42 may be formed separately or integrally. For example, in some embodiments, the supporting leg 42 may be casted onto the central portion 41.

The insulation supporting assembly 30 further comprises at least one connecting plate 50. For example, in some embodiments, the number of the connecting plates 50 may be equal to that of the supporting leg 42. In such embodiments, as shown in FIG. 2, three connecting plates 50 are provided. Alternatively, in other embodiments, the number of the connecting plates 50 may less than that of the supporting leg 42.

Figure 4:
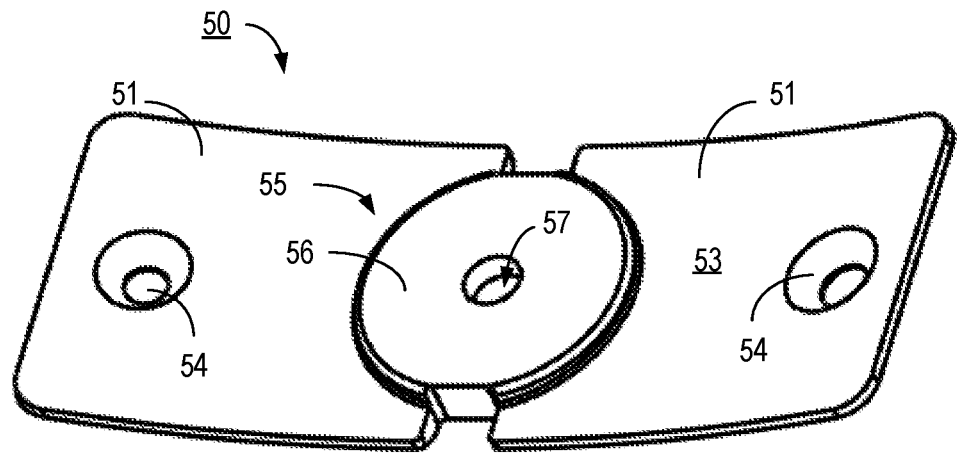
FIG. 4 illustrates a perspective view of a connecting plate according to embodiments of the present disclosure.

According to embodiments of the present disclosure, each connecting plates 50 is arranged at and mounted to an end 44 of a respective supporting leg 42. Furthermore, as shown in FIGS. 3 and 4, at least one hole 54 (also referred to as "first hole" herein) is provided on each connecting plate 50. A threaded fastener 61 (also referred to as "first threaded fastener" herein), such as a bolt or a screw, is used to mount the connecting plate 50 to the outer enclosure 10 through the hole 54. It is to be understood that although two holes 54 on the connecting plate 50 are shown in the embodiments of FIGS. 3 and 4, this is merely for the purpose of illustration without suggesting any limitation as to the scope of the present disclosure. In other embodiments, there can be any suitable number of hole(s) 54.

By using the threaded fastener 61, the connecting plate 50, and in turn the supporting leg 42 of the insulator 40, can be mounted to the outer enclosure 10 in an easy and detachable way, thereby solving the problems relating to welding spatters and inconvenience in disassemble.

In some embodiments, with reference to FIG. 3, on the inner surface 11 of the outer enclosure 10, a protrusion 12 may be provided. Protrusion 12 may comprise a hole 13 with thread, and may be fastened to the inner surface 11 in a variety of manners, such as bonding, welding, and so on. The position(s) of the protrusion 12 should be corresponding to the hole(s) 54 of the connecting plate 50. In this way, threaded fastener 61 may fix the connecting plate 50 to respective protrusion 12. For example, in the embodiments shown in FIGS. 2 and 3, six protrusions 12 are provided in total, divided into three groups. Each group comprises two protrusions 12 arranged at the positions corresponding to the two holes 54 of the connecting plate 50, respectively. It should be appreciated that the number and arrangement of the protrusion 12 shown in the embodiments are only exemplary and not intended for limiting the scope of the present disclosure.

Still in reference to FIGS. 2 and 3, in some embodiments, each supporting leg 42 may comprise a metallic insert 45 at the end 44. The metallic insert 45 may be embedded into the end 44 and hence fixed to the supporting leg 42 in a variety of manners, for example, by mold casting. The connecting plate 50 may comprise a hole 57 (also referred to as "second hole" herein), for example, substantially at the center of the connecting plate 50. In such an arrangement, a threaded fastener 62 (also referred to as "second threaded fastener") may be provided for mounting the connecting plate 50 to the metallic insert 45 of the respective supporting leg 42 through the second hole 57. In this way, connections between the supporting leg(s) 42 of the insulator 40 and the connecting plate 50 may be implemented by second threaded fastener(s) 62 as well.

Additionally, in some embodiments, a cover 64 for the second threaded fastener 62 may be provided in order to avoid the friction between the second threaded fastener 62 and the inner surface 11 of outer enclosure 10. As such, the generation of particles can be reduced or minimized. By way of example, the cover 64 may be made of low friction material, such as nylon, PTFE, and so on.

In various embodiments of the present disclosure, the connecting plate 50 serves as a "connector" between the supporting leg 42 and the outer enclosure 10. To this end, the connecting plate 50 may be formed with various shapes and structures that may achieve the connecting function.

For example, in some embodiments, the connecting plate 50 may be simply formed as a substantially flat plate, in particular, a rectangle flat plate. Alternatively, the connecting plate 50 may also be formed as a curved plate. For example, in some embodiments, the connecting plate 50 may comprises a curved body 51 mounted to the metallic insert 45. In such an embodiment, the curvature of the curved body 51 may be substantially suitable to the curvatures of the outer enclosure 10 and if any, a particle trap 80. Specifically, an outer surface 52 of the curved body 51 is adapted to fit to the curvature of the outer enclosure 10 or the protrusion(s) 12 thereon, and an inner surface 53 of the curved body 51 may be fit to the curvature of the particle trap 80. In this way, the connections between related components are stable and easy to implement.

Figure 5:
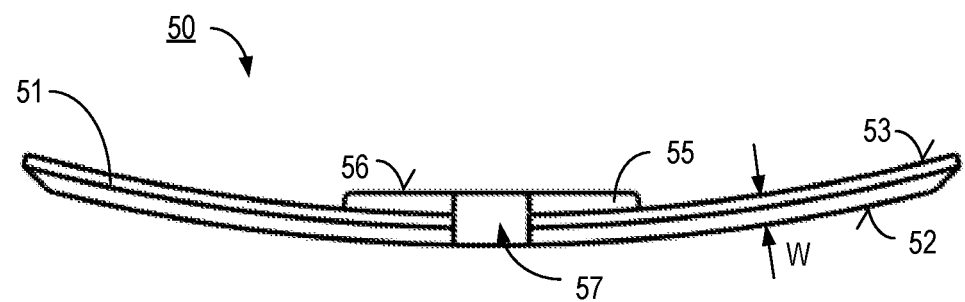
FIG. 5 illustrates a side view of the connecting plate as shown in FIG. 4.

In some further embodiments, for example as shown in FIGS. 4 and 5, the connecting plate 50 may further comprises a projection portion 55 protruding from the curved body 51. A top surface 56 of the projection portion 55 may be in contact with an outer surface 46 of a respective metallic insert 45. In other words, the contact between the top surface 56 and the outer surface 46 is implemented in a surface-to-surface way, thereby providing a reliable connection between the connecting plate 50 and the metallic insert 45.

The engaging surfaces 56, 46 may be formed in various profiles. For example, in some embodiments, a region of the top surface 56 or the whole top surface 56 may be substantially a flat surface, and correspondingly, a region of the outer surface 46 or the whole outer surface 46 may be substantially a flat surface as well. In such an arrangement, the second threaded fastener 62 may be arranged in the flat surface and hence connect the flat surfaces 56, 46. In this way, the top surface 56 may be in close contact with the outer surface 46, thereby improving the stability and reliability of connection.

Furthermore, in order to provide adequate strength and rigidness for the connecting plate 50, the material of the connecting plate 50 may be metal, such as aluminum alloy or steel. In addition, the thickness W of the connecting plate 50, for example, measured from the outer surface 52 to the inner surface 53 and substantially perpendicular to these two surfaces 52, 53, may be substantially in a range of 3 mm to 5 mm, in particular, 3.5 mm to 4.5 mm, such as 4 mm.

Referring back to FIGS. 1 and 2, in some embodiments, the insulator 40 may further comprises a sleeve 70 arranged in the through hole 43 of the central portion 41 of the insulator 40. The sleeve 70 may be made of metal, such as aluminum alloy or steel, and fixed in the through hole 43 in a variety of manners, for example, by mold casting. The thickness of the sleeve 70 may be substantially in a range of 8 mm to 12 mm. The sleeve 70 may be an elongated, cylindrical tube, comprising two ends 71, 72. The sleeve 70 may further comprise at least one hole 73 (also referred to as "third hole"). In such an arrangement, a threaded fastener 63 (also referred to as "third threaded fastener") may be provided for mounting the sleeve 70 to the inner conductor 20 of the gas-insulated transmission line 1 through the third hole 73. In an example embodiment, three third holes 73 may be provided at each of the two ends 71, 72, in which the three third holes 73 are arranged about 120 degrees apart from each other in the circumferential direction of the sleeve 70.

In some embodiments, with reference to FIG. 1, the sleeve 70 may comprise an outer surface 74 with two narrowing ends 71, 72. For example, the outer surface 74 may comprise a curved section 75 at an end 71 or end 72, additionally or alternatively, at both ends 71, 72. In this way, the outer surface 74 may taper as extending along the central axis X to the end(s) 71, 72 of the sleeve 70. Therefore, compared to the sleeve with a straight wall, the sleeve 70 in these embodiments may eliminate sharp corner, thereby prevent charge from accumulating at the sharp corner. By this arrangement, a risk of breakdown an insulating gas in the outer enclosure may be reduced or minimized.

Based on the above description, the insulation supporting assembly 30 according to embodiments of the present disclosure may be mounted into the gas-insulated transmission line 1 in an easier and more convenient way, thereby improving the appliance of the insulation supporting assembly 30 and the gas-insulated transmission line 1 comprising the same.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An insulation supporting assembly comprising:
    an insulator comprising:
        a central portion comprising a through hole extending along a central axis and adapted to receive an inner conductor of a gas-insulated transmission line; and
        at least one supporting leg extending outwardly from the central portion in a radial direction normal to the central axis; and
    at least one connecting plate, each of the at least one connecting plate arranged at an end of a respective supporting leg and comprising at least one first hole for mounting the respective connecting plate to an outer enclosure of the gas-insulated transmission line by a first threaded fastener.

2. The insulation supporting assembly of claim 1, wherein each supporting leg comprises a metallic insert at the end; and
    wherein each of the at least one connecting plate comprises a curved body adapted to be mounted to the metallic insert of the respective supporting leg by a second threaded fastener.

3. The insulation supporting assembly of claim 2, wherein each of the at least one connecting plate further comprises a projection portion protruding from the curved body and comprising a top surface, and wherein the top surface contacts with an outer surface of a respective metallic insert.

4. The insulation supporting assembly of claim 1, wherein each of the at least one connecting plate is made of aluminum alloy or steel, and comprises a thickness in a range of 3 mm to 5 mm.

5. The insulation supporting assembly of claim 1, wherein the insulator further comprises:
    a sleeve, arranged in the through hole of the central portion of the insulator and comprising at least one third hole for mounting the sleeve to the inner conductor of the gas-insulated transmission line by a third threaded fastener.

6. The insulation supporting assembly of claim 5, wherein an outer surface of the sleeve comprises a curved section such that the outer surface of the sleeve tapers as extending along the central axis to an end of the sleeve.

7. A gas-insulated transmission line, comprising:
    an outer enclosure at a first electrical potential;
    an inner conductor at a second electrical potential higher than the first electrical potential; and
    an insulation supporting assembly of claim 1,
    each of the at least one connecting plate of the insulation supporting assembly mounted to the outer enclosure by the first threaded fastener.

8. The gas-insulated transmission line of claim 7, wherein the outer enclosure comprises at least one protrusion at a position corresponding to each of the at least one connecting plate, and wherein each of the at least one connecting plate is mounted to a respective protrusion by the first threaded fastener.

9. The gas-insulated transmission line of claim 7, wherein the insulator is mounted to the inner conductor by a third threaded fastener.

10. The gas-insulated transmission line of claim 1, wherein each of the at least one connecting plate is coupled to the end of the respective supporting leg.

\* \* \* \* \*